United States Patent [19]

Bugnet et al.

[11] Patent Number: 4,882,232

[45] Date of Patent: Nov. 21, 1989

[54] POROUS METAL STRUCTURE AND METHOD OF MANUFACTURING OF SAID STRUCTURE

[75] Inventors: Bernard Bugnet, Champs sur Marne; Denis Doniat, Le Perreux, both of France

[73] Assignee: Sorapec Societe de Researche et d'Applications Electrtochimiques, Fontenay sous Bois, France

[21] Appl. No.: 204,118

[22] Filed: Jun. 8, 1988

Related U.S. Application Data

[63] Continuation of Ser. No. 78,055, Jul. 27, 1987, abandoned, which is a continuation of Ser. No. 693,040, Jan. 22, 1985, abandoned.

[30] Foreign Application Priority Data

Jan. 25, 1984 [FR] France ................................. 84 01110

[51] Int. Cl.$^4$ .......................... C25D 5/56; C23C 14/34
[52] U.S. Cl. ...................................... 428/613; 204/20; 204/384; 204/192.14; 204/192.15
[58] Field of Search ...................... 204/192.11, 192.12, 204/192.14, 20, 38.4, 192.15; 428/613

[56] References Cited

U.S. PATENT DOCUMENTS

| | | | |
|---|---|---|---|
| 3,549,505 | 12/1970 | Hanusa | 204/11 |
| 3,694,325 | 9/1972 | Katz et al. | 204/11 |
| 3,871,411 | 3/1975 | Sato et al. | 138/178 |
| 4,461,689 | 6/1084 | Diepers | 204/192 N |
| 4,544,468 | 10/1985 | Münz et al. | 204/192 R |

OTHER PUBLICATIONS

J. J. Bessot, New Vacuum Deposition Techniques, Metal Finishing, Mar. 1980, pp. 21–26; Apr. 1980, pp. 63–69.

*Primary Examiner*—John F. Niebling
*Assistant Examiner*—William T. Leader
*Attorney, Agent, or Firm*—Bucknam and Archer

[57] ABSTRACT

A method of fabrication of porous metal structures as applicable to the manufacture of supports for electrodes, catalysts, filters or sound insulators. A porous structure is fabricated from a support consisting of a felt, a woven or reticulated structure in accordance with the following steps:

(a) initial metallization of the support;
(b) chemical and/or electrochemical metallization if so required;
(c) removal of the support if necessary.

The distinctive feature of the invention lies in the fact that the initial metallization step consists of metallization in vacuum.

5 Claims, No Drawings

POROUS METAL STRUCTURE AND METHOD OF MANUFACTURING OF SAID STRUCTURE

This is a continuation of Ser. No. 078,055, filed 7/27/87, now abandoned, which is a continuation of U.S. Ser. No. 693,040, filed 1/22/85, now abandoned.

BACKGROUND OF THE INVENTION

1. Field of the Invention

This invention generally relates to the field of manufacture of porous metal structures.

The invention is more particularly directed to the field of manufacture of porous metal structures for the purpose of applications such as supports for electrodes, catalysts, filters, sound insulators or the like.

2. Description of the Prior Art

Methods have already been proposed for the manufacture of metallic structures having a cellular or fibrous character and employed in the electrochemical industry.

The structures considered are of the porous or highly porous type and are provided in the form of a three-dimensional lattice network which defines a plurality of spaces in communication with each other.

These porous supports which it is desired to metallize or put in a conductive state are often fabricated from a synthetic or artificial porous material which is then made conductive, for example by means of a chemical surface treatment.

In consequence, the initial structure is constituted by said porous support, which can be an agglomerate of fibers whether in an ordered state or not and consisting, for example, of a felt, a woven fabric or a reticulated structure.

When a reticulated structure is employed, and in order to obtain at the outset an open-pore structure or in other words a structure in which the cells can communicate with each other, a processing step known as "uncapping" is performed with sodium hydroxide, for example.

The structure thus obtained can then be coated, for example, with a conductive or partially conductive material by chemical or electrochemical process. Methods have thus been proposed for depositing a metal by reduction of ammoniacal silver nitrate in situ.

After this step, provision can be made in certain cases for a second metal coating deposited by chemical and/or electrochemical process. On completion of these two steps, the initial support can then be removed and the metal may be annealed if necessary.

It has been generally considered that these methods could give rise to major practical difficulties at the industrial development stage.

These difficulties are essentially related to the complexity of the operating cycles which are involved and to the large number of liquid-phase treatments carried out successively (processing steps which involve uncapping, sensitization, chemical and electrochemical metallizations), thus entailing the risk of pollution of baths with respect to each other and defects of reproducibility.

For further details, reference can be made to French patent application No. FR 70 22469 filed on June 18th, 1970. Those versed in the art can also refer to French patent application No. FR 79 17540 assigned to the same assignee as the present application and relating to electrode supports and their applications for electrochemical generators. This specification describes a method for obtaining structures of the same category as those of the present invention and their applications.

The methods described in said French patent application No. FR 79 17540 prove satisfactory in regard to the results achieved but do not remove the disadvantages which have already been mentioned and which arise at the industrial development stage except in the event of particularly stringent inspection testing.

Finally, from a general standpoint, it is always desirable to endeavor to reduce the costs of existing methods and to make them even easier to carry into practical effect; these are two of the advantages obtained by means of the present invention.

SUMMARY OF THE INVENTION

This invention has for its object a new and novel method of fabrication of porous metal structures, especially reticulated or fibrous structures which permit shorter production times with a higher degree of reliability.

This method of manufacture is applicable to supports constituted by reticulated or woven structures, or by felts. The method involves the following steps:

(a) initial metallization of said support;
(b) chemical and/or electrochemical metallization if so required;
(c) removal of said support if necessary; said method being distinguished by the fact that said metallization step (a) consists of metallization in vacuum.

Metallization in vacuum can be carried out by any method known at the present time for other applications, and in particular by cathode sputtering, gaseous diffusion or ionic deposition.

The techniques of vacuum metallization which have been applied up to the present time only to flat or substantially flat surfaces are well-known to those skilled in the art and have been extensively described in the literature. These techniques will therefore not be considered in detail hereinafter.

Likewise the methods of chemical and electrochemical metallization which form part of state-of-the-art techniques will not be described below.

As has been mentioned in the foregoing, the method in accordance with the invention can comprise in step (b) a second metallization which can be performed by chemical and/or electrochemical process.

The advisability of choice between one processing route or the other or of a combination of both routes will be determined by those versed in the art according to the ultimate objectives to be achieved or in other words will depend on the intended characteristics of the porous structure in the final state as well as the metal or metals with which it is desired to coat the structure.

As a general rule, a metallization by electrochemical process is carried out within the scope of step (b) but it is possible to carry out a preliminary metallization by chemical process in order to increase the conductivity of the support after it has been subjected to vacuum metallization.

After the metallization step or steps, the material constituting the initial support can be removed, for example by heat treatment. This removal permits a reduction in weight of the structure and is also conducive to an increase in porosity and developed surface area of said structure, thus constituting an additional advantage.

It is possible to carry out an ultimate annealing step in the usual manner when the basic support has been removed in order to endow the metallic structure with enhanced mechanical properties.

When the basic structure employed is of the cellular type or porous type, a so-called "uncapping" operation has to be performed prior to the vacuum metallization step (a) in order to meet the requirements of the main applications contemplated by the invention. This uncapping operation consists in opening the pores in order to obtain a reticulated structure. Within the scope of the present patent Application, a reticulated structure is understood to refer to a structure having a high degree of porosity or a large open-pore volume in which the meshes of the lattice network communicate with each other completely or at least to a very considerable extent.

When an uncapping step is performed, this treatment can be carried out by means of an aqueous sodium hydroxide or potassium hydroxide solution or any other similar agent which has the effect of opening the cellular structure.

The material constituting the basic reticulated support, namely felt or fabric, can be either a natural, synthetic or mineral substance and especially a polymer such as, for example, polyester, polyamide, polyurethane, polyether, a resin and, in the case of fibrous structures, glass fibers, rock or carbon fibers, natural fibers, wool, cotton or the like, this list being in no way intended to imply any limitation.

It will be readily apparent that the polymer or any other non-conductive material employed can contain additional filler materials which make the basic structure conductive. One example of a suitable filler material is carbon.

It has been mentioned in the foregoing description that the basic structure was porous. The term "porous" is understood to mean that this structure has a specific surface area which is larger, and even considerably larger, than its apparent surface area. For certain applications, this structure has an open-pore volume higher than 80% and even higher than 90%, and in some cases of the order of 95 to 98%.

The initial structure is provided in the form of a piece of felt or fabric having any desired shape and dimensions. When a reticulated structure is employed, this latter can consist for example of a foam or a sponge in which the pores or cells have been opened.

During the vacuum metallization step, the structure to be coated is preferably mounted on a rotary device of the carousel type in order to present each face of said structure towards the metal source. This device can also possess additional degrees of freedom in order to permit the possibility of inclining the support if this should prove necessary.

The metal employed in the vacuum metallization step (a) can generally consist of any metal or alloy which is suited for use within the field of application of this technique and especially in methods of cathode sputtering, gaseous diffusion or ionic deposition.

It will be understood that no exhaustive list can be given. By way of illustration, however, the following metals can be mentioned: platinum and platinum-base alloys, nickel, chromium, iron, copper, gold, silver, tin, aluminum, titanium, zinc, and so on. In regard to the alloys, the following can be mentioned: brass, bronze, Monel, ferro-chromium alloys or a combination of these metals or alloys.

It should be explained that the term "metal" as used in this specification is also intended to designate alloys of two or more metals.

As will readily be apparent, the metal deposited by electrochemical and/or chemical process in step (b) can be identical with or different from the metal deposited during the vacuum metallization step (a). In this case also, it is not possible to given an exhaustive enumeration of these metals.

It will be noted that, when the metal employed for the second metal deposition process (step b) is different from the metal of the first deposition process (step a), the annealing step can offer an additional advantage in comparison with the known modifications of mechanical properties of metals. This advantage lies in interdiffusion of the deposited metals, which can finally result in the formation of an alloy. In some applications, the formation of an alloy of this type in situ can constitute a substantial advantage.

As a general rule, the vacuum metallization operation is stopped when the metal coating which is limited to the apparent surface of the support attains a thickness within the approximate range of 0.05 micron to 1 micron or more. Thicknesses of the order of 1/10 of a micron have been considered as particularly suitable.

It will be noted that an advantage arising from the execution of a vacuum metallization step lies in the fact that the materials and more particularly the polymers employed for forming the basic structure are not liable to be attacked by more or less corrosive chemical baths.

A second advantage is that this technique makes it possible to circumvent or reduce the problems of retention of treatment baths in the structure, thus making it possible to reduce or suppress the successive pollution of chemical and electrochemical baths.

It must be emphasized that, up to the present time, vacuum metallization techniques appeared to those versed in the art as being inapplicable to complex structures and more particularly to porous structures for the purpose of obtaining a continuous deposit. The invention has overcome this prejudice and has permitted the realization of a new and novel method which achieves a higher performance and results in the formation of products having improved characteristics.

In order to carry out metal deposition in vacuum, the parts to be coated are preferably placed on a rotary support of the carousel type, more particularly a carousel having two rotations and providing access to the source of metal in all positions and at all angles of inclination.

It will be clearly apparent that the invention is not only concerned with the method of manufacture but also with the metallic structures obtained by means of this method as well as the applications of these latter, especially such applications as electrode supports, supports for catalysts, for filters, sound insulators or the like.

In fact, the structures in accordance with the invention can be employed in all applications in which it is necessary to provide a porous or even in a very highly porous structure having in addition conductive properties (conduction of electricity, heat or sound), or particular mechanical, chemical or physical properties corresponding to those offered by products in accordance with the invention.

Among these numerous applications, the following can be mentioned by way of illustration:

supports for the fabrication of electrodes for storage batteries or dry cell battery units, especially electrodes formed of nickel, cadmium, lead, iron or the like as well as electrodes for fuel cells;

supports for catalysts, for example for industrial chemical reactions, especially in cracking plants or the like, or for recombination reaction of gases of internal combustion engines in accordance with the new anti-pollution regulations;

sound insulation: in this case the structure in accordance with the invention can be filled with material having good sound-insulating characteristics and-/or formed of a suitable metal or alloy.

It will naturally be understood that this list cannot be considered as implying any limitation.

The following examples are given by way of illustration without limiting the scope of the invention in any sense whatsoever.

EXAMPLE 1

There is employed an element of polyurethane foam having a thickness of 1.5 mm, a width of mesh of 0.5 mm and a connective-strip thickness of 40 microns.

The first operation consists of opening the porous structure ("uncapping") by immersing the polyurethane structure in a 6N potassium solution at a temperature of 50° C. over a period of 15 minutes.

The structure is rinsed with water and then dried.

The next step consists in forming a coating of copper by cathode sputtering during a period of 2 minutes.

The thickness of deposited copper limited to the apparent surface of the coated structure is 0.04 micron.

The following operation consists of copper-plating in a bath of the usual type during a period of 10 minutes.

Finally, an electrochemical nickel-plating operation is performed in a Watt bath at a current intensity of 8 A/dm$^2$ during a period of 45 minutes.

EXAMPLE 2

There is employed a felt of polyether having a thickness of 2 mm, the diameter of the fibers being 40 microns and the surface density being 5 mg/cm$^2$.

Deposition of brass is performed by cathode sputtering, the felt being exposed during a period of 5 minutes.

The mean thickness of metal limited to the apparent surface is 0.1 micron.

Chemical copper-plating is then carried out in a commercial bath during a period of 50 minutes.

EXAMPLE 3

There is employed a polyether foam having a thickness of 3 mm, a mesh diameter of 0.6 mm and a connective-strip thickness of 45 microns.

An uncapping operation is first performed by immersing the foam in a 6N potassium solution at a temperature of 50° C. during a period of 10 minutes.

The foam is rinsed with water and dried.

A copper-plating operation is carried out by gaseous diffusion during a period of 8 minutes.

The coating of copper limited to the apparent surface has a thickness of 0.5 micron.

An electrochemical nickel-plating operation is then carried out in a Watt bath at 8 A/dm$^2$ during a period of 60 minutes.

By making use of the three structures obtained in the three examples described in the foregoing, it has been possible to fabricate electrodes, especially of cadmium and of nickel, which have proved to possess outstanding properties.

It should be clearly understood that the invention cannot be considered as being limited to the specific examples of execution which have been given and that other forms of execution could be devised by those versed in the art without thereby departing from the scope or the spirit of the invention.

What is claimed is:

1. A method of fabrication of a metallized porous structure from an organic porous support having a three-dimensional lattice network with an open pore volume higher than 80% which defines a plurality of pores substantially in communication with each other, which comprises the step of premetallizing said support under vacuo by cathode sputtering with a metal or alloy which is a member selected from the group consisting of platinum, platinum-base alloys, nickel, chromium, iron, copper, gold, silver, tin, aluminum, titanium, zinc, brass, bronze, a ferrochromium alloy and a mixture thereof, thereby depositing on said support a continuous layer of 0.05 micron to 1 micron of said metal or alloy and then applying at least one metal layer of copper or nickel by a chemical or electrochemical process.

2. The method according to claim 1 wherein prior to the step of premetallizing, the pores of said support have been opened by an uncapping operation.

3. The method according to claim 1 wherein in said premetallizing step a layer of copper, nickel or brass is deposited.

4. The method according to claim 1 wherein the support is made of a synthetic polymer which is a polyester, a polyamide, a polyurethane or a polyether.

5. An electrode support for a nickel, cadmium, iron or lead electrode made of the metallized porous structure produced by the method of claim 1.

* * * * *